Patented Aug. 17, 1937

2,090,274

UNITED STATES PATENT OFFICE 2,090,274

GRINDING HARD SINTERED CARBIDE COMPOSITIONS

Prescott H. Walker and Arthur H. Prey, Niagara Falls, N. Y., assignors, by mesne assignments, to The Carborundum Company, Niagara Falls, N. Y., a corporation of Delaware No Drawing. Application June 4, 1934, Serial No. 728,979. In Canada June 4, 1931

5 Claims. (Cl. 51—278)

This invention relates to methods of grinding or abrading hard sintered carbide compositions and to an abrasive article particularly adapted for such use.

In recent years there has been a considerable increase in the number and variety of carbide compositions used as tool points because of their extreme hardness. The varieties most often used include the carbides of tungsten, tantalum and titanium and in addition to these the carbides of vanadium, chromium, molybdenum, columbium, uranium, zirconium and thorium have been suggested for use in the production of these hard tool points.

These carbides are used in the form of sintered mixtures of finely divided carbide and softer metal used as the matrix for the mixture. For example, a tungsten carbide tool point comprises a sintered mixture of finely divided tungsten carbide and cobalt.

The principal physical characteristics of these carbide compositions are their extreme hardness and relatively small shear strength. Referring to Mohs scale of hardness, these hard metal carbides lie between 9 and 10 and the harder varieties have a hardness between that of fused alumina and silicon carbide.

Of the common abrasive materials available the only ones which approach the hardness of the carbide compositions are silicon carbide and fused alumina. The principal carbides used are harder than fused alumina so that its use in grinding carbide compositions is limited to those members of the class which lie below it in hardness and even then the difference in hardness in favor of the fused alumina is so slight as to be practically negligible. All varieties of silicon carbide are harder than all varieties of the carbide compositions commonly produced so far.

It is customary for purposes of control by persons skilled in the abrasive art to classify silicon carbide according to its color. It is customary to make a crystal count from samples taken from batches made for commercial use based on the following groups: black, dark green, medium green, light green, and substantially colorless. For the general purposes of control the groups black and dark green are classed as black and the groups medium green, light green and colorless are classed together as a group designated green and this group consists of clear green crystals. Silicon carbide may therefore be divided into two classes by color. These classes are black silicon carbide and the variety which is a clear green.

Black silicon carbide is harder than green silicon carbide, the difference in hardness between the two varieties being as great as the difference between green silicon carbide and the hardest of the sintered carbide compositions described above. It would appear then that of the common abrasive materials the black variety of silicon carbide would be superior because of the maximum difference in hardness between it and the compositions to be abraded. Contrary to this expectation and contrary to other expectations in view of the nature of the material to be abraded, it has been found in connection with the present invention that an abrasive article quite porous and relatively soft in physical structure and containing silicon carbide of which at least 50% is of the clear green variety gives unexpectedly valuable results in abrading these hard metal carbide compositions.

The silicon carbide known commercially as green silicon carbide contains on the average about 27% of green crystals based on samples taken and examined over a period of a great many years. Because of the greater hardness of the black variety of silicon carbide it has been the trend in recent years to produce for general purposes the black variety of silicon carbide containing less than 3% green crystals. When the manufacture of silicon carbide for abrasive purposes was first started and for many years thereafter it was of the commercial green variety described above but in recent years, due to the greater hardness of black silicon carbide, the latter has supplanted it to a considerable extent.

In connection with the present invention however, it has been found that abrasive articles containing on the average 60% of clear green crystals when examined in ordinary light, and not less than 50%, is substantially superior to the black variety of silicon carbide and all other common abrasive materials for use in abrading the hard metal carbide compositions.

The color of silicon carbide depends upon the purity of the materials used in its manufacture. For example, if an impure variety of carbon is used, such as metallurgical coke, and an impure variety of silica is used, the batch of silicon carbide produced from such raw materials will be substantially all of the black variety, whereas if the materials are relatively pure the silicon carbide produced will have a relatively larger percentage of green crystals. In the production of the extremely green silicon carbide used in the present invention, it is necessary to use almost chemically pure carbon and chemically pure silica.

In connection with the present invention, it has also been found that green silicon carbide is most effective in abrading the hard metal carbide compositions when bonded into a relatively soft abrasive article of relatively great porosity. For example, it has been found preferable to form the abrasive material into an article having at least 40% porosity.

In order to further define and explain the expression "relatively soft" as used herein, the method by which a wheel of this type is tested will be briefly described. The test is carried out by striking the wheel a definite number of blows with a tool of a definite weight. Each blow is produced by dropping the tool onto the wheel through a definite space. The tool used has a bit, rectangular in cross section with a flat end, and it is dropped whereby the bit strikes the wheel perpendicularly. The tool is maintained throughout the test with its longitudinal axis above a selected point on the wheel. After each impact the tool is turned slightly about its longitudinal axis whereby it strikes the wheel in an area at an angle to the area of impact of the previous blow so that for a complete cycle of impacts, or a complete test, the tool makes a complete revolution about its longitudinal axis. The hole formed in the wheel is therefore substantially circular with a diameter substantially equal to the diagonal dimension of the face of the tool bit. The tool bits are selected with the small dimension $\frac{1}{16}''$ and with the other dimension varying according to the grit size of the wheel to be tested, from $\frac{3}{32}''$ for the small grit to $\frac{1}{4}''$ for the larger grit. For the same size tool bit and the same weight of tool and drop, the depth of penetration produced in a wheel by a definite number of blows, for example, 25 is a direct measure of the softness of the wheel.

During the testing operation a stream of air is directed against the point of impact of the tool on the wheel to remove the detritus formed by each blow.

The wheels of the present invention are customarily graded by means of a tool weighing 550 grams which is permitted to drop in a cycle of 25 drops from a height of ½″ onto the wheel as described above. For grit sizes coarser than 80 grit, a bit having a cross section of $\frac{1}{16}'' \times \frac{1}{4}''$ is used and for wheels having a grit size of 80 or finer, a bit having a cross section of $\frac{3}{32}'' \times \frac{1}{16}''$ is used.

The present invention includes the use of wheels having a penetration according to this method of 32 to 135 thousandths of an inch. The wheels falling within this range are "relatively soft" as the expression is used herein.

The grit sizes of the grains used in the wheels of the present invention are principally those which will barely pass through screens of 60, 80, 100 and 120 meshes to the linear inch. The wheels are bonded with vitreous or organic binders in a manner analogous to that ordinarily used except that slightly larger percentages of bond are found necessary, particularly in the case of vitrified binders to obtain a wheel of given grade, than is the case in standard practice.

The wheels used according to the present invention are relatively highly porous, e. g. 40% or more porosity. This porosity can be obtained by means of various modifications of the regular procedure; e. g. by varying the percentage of bond used, by controlling pressure applied during the forming, by the addition of ingredients to the mix which burn out during firing, or by other changes.

The method of the invention involves grinding a mass of hard metal carbide composition while it is set in the edge of a steel support with a soft, porous, green silicon carbide grinding wheel. The carbide and the steel support are brought into contact with the grinding wheel whereby the carbide and the steel support are ground simultaneously or very nearly so. A tip for use as a cutting edge is given a sharp edge by grinding it while mounted in its steel shank and the carbide and shank are ground substantially simultaneously. When the soft, porous, green silicon carbide tool is thus used to grind hard metal carbide tools it shows a distinct superiority over other wheels and other methods. For example when a wheel made according to the present invention having an abrasive content of silicon carbide including at least 50% of clear green crystals, a second wheel identical in all respects except that it had an abrasive content of black silicon carbide as defined above, that is having less than 3% of green crystals, and a third wheel identical with the others in all respects except that it was of the "commercial green" variety defined above, were tested under identical conditions in grinding a tungsten carbide tool bit fitted in a steel shank, the new green wheel showed an efficiency ratio substantially twice that of the black wheel or of the "commercial green" wheel. Furthermore the black wheel and the "commercial green" wheel ground hot whereby the tool became red hot in 45 to 90 seconds, requiring grinding the tool in short intervals. The green wheels on the other hand cut cool, permitting the operator to grind the tool continuously throughout the test. If the hard metal carbide tool point is heated unevenly or to too great a degree by the grinding operation it will be ruined by having cracks formed in it. For example, a piece of tungsten carbide improperly ground whereby excessive heat was developed had its internal strength reduced from 217,000 pounds before grinding to 27,000 pounds after grinding. The use of a wheel consisting essentially of black silicon carbide therefore requires the exercise of considerable judgment upon the part of the operator whereas the green silicon carbide wheel made according to the present invention and used according to the present invention may be used to grind a mounted tool point continuously. The judgment required in the use of a black silicon carbide wheel is beyond the powers of most operators and when one considers that the cost of a single tool may be more than a week's salary of an operator, it will be understood that the risk is too great to permit dependence upon the operator's judgment. It will thus be seen that the method of the present invention provides a "fool-proof" method of grinding the hard metal carbide tools while providing also an exceptionally high efficiency ratio.

We claim:

1. A bonded abrasive article for abrading hard metal carbide compositions comprising abrasive material consisting of silicon carbide grains including at least 50% of clear green crystals, said abrasive article being relatively soft and at least 40% porous.

2. A bonded abrasive article for abrading hard metal carbide compositions, comprising abrasive material consisting of silicon carbide grains including at least 60% of clear green crystals the said abrasive article being relatively soft and at least 40% porous.

3. A method of sharpening a tool consisting of a body of hard metal carbide composition as the cutting edge and a steel shank in which said body is set which comprises grinding said hard metal carbide and said steel shank substantially simultaneously with a relatively soft grinding wheel having a porosity of at least 40% and an abrasive content comprising at least 50% of clear green silicon carbide crystals.

4. A method of sharpening a tool consisting of a body of tungsten carbide composition as the cutting edge and a steel shank in which said body is set which comprises grinding said tungsten carbide and said steel shank substantially simultaneously with a relatively soft grinding wheel having a porosity of at least 40% and an abrasive content comprising at least 50% of clear green silicon carbide crystals.

5. A method of sharpening a tool consisting of a body of hard metal carbide composition as the cutting edge and a steel shank in which said body is set which comprises grinding said hard metal carbide and said steel shank substantially simultaneously with a relatively soft grinding wheel having a porosity of at least 40% and an abrasive content consisting of silicon carbide grains including at least 50% of clear green crystals.

PRESCOTT H. WALKER.
ARTHUR H. PREY.